United States Patent
Yao et al.

(10) Patent No.: US 11,256,697 B2
(45) Date of Patent: Feb. 22, 2022

(54) DATABASE QUERY OPTIMIZATION METHODS, APPARATUSES, AND COMPUTER DEVICES

(71) Applicant: Beijing OceanBase Technology Co., Ltd., Beijing (CN)

(72) Inventors: Yingying Yao, Hangzhou (CN); Yi Xiao, Hangzhou (CN); Yang Li, Hangzhou (CN); Yi Pan, Hangzhou (CN); Zhiyong Jiang, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 17/084,840

(22) Filed: Oct. 30, 2020

(65) Prior Publication Data

US 2021/0117424 A1   Apr. 22, 2021

Related U.S. Application Data

(63) Continuation of application No. PCT/CN2019/096355, filed on Jul. 17, 2019.

(30) Foreign Application Priority Data

Aug. 31, 2018  (CN) .......................... 201811013928.8

(51) Int. Cl.
 *G06F 16/2453* (2019.01)
 *G06F 16/242* (2019.01)
(52) U.S. Cl.
 CPC .... *G06F 16/24544* (2019.01); *G06F 16/2445* (2019.01)

(58) Field of Classification Search
 CPC ...................... G06F 16/24544; G06F 16/2445
 See application file for complete search history.

(56) References Cited

U.S. PATENT DOCUMENTS

| | | |
|---|---|---|
| 6,493,701 B2 | 12/2002 | Ponnekanti |
| 7,987,179 B2 | 7/2011 | Ma et al. |

(Continued)

FOREIGN PATENT DOCUMENTS

| | | |
|---|---|---|
| CN | 101853257 | 10/2010 |
| CN | 106708954 | 5/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mark D Featherstone
*Assistant Examiner* — Ranjit P Doraiswamy
(74) *Attorney, Agent, or Firm* — Fish & Richardson P.C.

(57) ABSTRACT

A database query optimization computer-implemented method, medium, and system are disclosed. In one computer-implemented method, a data query request sent by a client device is received and parsed. An execution plan for executing the data query request is determined based on a parsing result. If the execution plan is a nested loop anti-join, whether there is a possibility that a to-be-queried field in a to-be-queried data table indicated by the data query request contains a NULL value is determined. If there is a possibility that the to-be-queried field contains a NULL value, a filter condition is generated and the execution plan is optimized based on the filter condition.

17 Claims, 3 Drawing Sheets

(56) References Cited

U.S. PATENT DOCUMENTS

2007/0219952 A1* 9/2007 Ahmed ............ G06F 16/24537
2016/0196302 A1 7/2016 Beavin et al.
2017/0199875 A1* 7/2017 Nevrekar ............ G06F 16/9032

FOREIGN PATENT DOCUMENTS

| | | |
|---|---|---|
| CN | 106897343 | 6/2017 |
| CN | 107168977 | 9/2017 |
| CN | 109241101 | 1/2019 |
| TW | 200300243 | 5/2003 |
| TW | 200515189 | 5/2005 |
| TW | 201129002 | 8/2011 |
| TW | 201439915 | 10/2014 |

OTHER PUBLICATIONS

Geek-share.com [online], Liu, "In-depth analysis: The principle and equivalent rewriting method of semi-join and anti-join," Mar. 27, 2018, retrieved on Nov. 23, 2020, retrieved from URL<https://yq.aliyun.com/articles/570858>, 43 pages (with machine translation).

Nakamoto, "Bitcoin: A Peer-to-Peer Electronic Cash System," www.bitcoin.org, 2005, 9 pages.

PCT International Search Report and Written Opinion in International Application No. PCT/CN2019/096355, dated Sep. 27, 2019, 10 pages (with partial English translation).

Zhao et al., "Cost-Based Performance Stpudy of Oracle Subquery," Journal of China West Normal University (Natural Sciences), Sep. 2013, 34(3):265-270 (with English abstract).

PCT International Preliminary Report on Patentability International Application No. PCT/CN2019/096355, dated Mar. 2, 2021, 10 pages (with English translation).

\* cited by examiner

DATABASE QUERY OPTIMIZATION METHODS, APPARATUSES, AND COMPUTER DEVICES

CROSS-REFERENCE TO RELATED APPLICATIONS

This application is a continuation of PCT Application No. PCT/CN2019/096355, filed on Jul. 17, 2019, which claims priority to Chinese Patent Application No. 201811013928.8, filed on Aug. 31, 2018, and each application is hereby incorporated by reference in its entirety.

TECHNICAL FIELD

Embodiments of the present specification relate to the field of database technologies, and in particular, to database query optimization methods, apparatuses, and computer devices.

BACKGROUND

With the development of information technologies, databases have been widely used, and users' needs for querying data in the databases are becoming more complex. Thus, a database query needs to be optimized to improve query efficiency and accuracy. To optimize a type of query that involves table joins with join conditions involving NOT IN (equivalent to !=ALL) operators, a conventional technical method is to convert a table join method for such type of query into an anti-join. A join condition for the anti join is T1.x=T2.y, and its semantics is that as long as there is a record that satisfies the join condition in the right table T2, a record that satisfies the join condition in the left table T1 is deleted, and a record that does not satisfy the join condition in T1 is finally returned.

The nested loop join (hereinafter referred to as NLJ) algorithm is one of common table join implementation methods, and has an advantage of fast response in comparison with other table join implementation methods. Under particular preconditions, the NLJ algorithm has very high execution efficiency. In other words, under particular preconditions, the NLJ algorithm may be the optimal execution plan in terms of cost.

However, in a relational database, a NULL value is a special existence, and the special thing is that a returned result for comparison between the NULL value and any other value is "unknown", for example, for 5=NULL, 5!=NULL, NULL=NULL, and NULL!=NULL, the returned results are all "unknown". Therefore, when the NLJ algorithm is used as the anti join implementation method, no accurate query result can be obtained if T1.x contains one or more NULL values. If T2.y contains one or more NULL values, after a query result is obtained by using the NLJ algorithm, the query result needs to be filtered once. A filtering process is specifically as follows: If T2.y is found to contain a NULL value, all data in the query result is filtered out. In other words, an empty query result is finally obtained. It can be determined that, if there is a NULL value in a table to be queried, using the NLJ algorithm as an anti join implementation method affects the query efficiency and accuracy.

SUMMARY

To alleviate the previously described technical problems, embodiments of the present specification provide database query optimization methods, apparatuses, and computer devices. Technical solutions are as follows:

According to a first aspect of embodiments of the present specification, a database query optimization method is provided, where the method includes the following: receiving a data query request sent by a client device; parsing the data query request, and determining an execution plan for executing the data query request based on a parsing result; if the execution plan is a nested loop anti-join, determining whether there is a possibility that a to-be-queried field in a to-be-queried data table indicated by the data query request contains a NULL value; and if there is a possibility that the to-be-queried field contains a NULL value, generating a filter condition and optimizing the execution plan based on the filter condition.

According to a second aspect of embodiments of the present specification, a database query optimization apparatus is provided, where the apparatus includes the following: a receiving module, configured to receive a data query request sent by a client device; a parsing module, configured to parse the data query request, and determine an execution plan for executing the data query request based on a parsing result; a determination module, configured to: if the execution plan is a nested loop anti-join, determine whether there is a possibility that a to-be-queried field in a to-be-queried data table indicated by the data query request contains a NULL value; and an optimization module, configured to: if there is a possibility that the to-be-queried field contains a NULL value, generate a filter condition and optimize the execution plan based on the filter condition.

According to a third aspect of embodiments of the present specification, a computer device is further provided, including a memory, a processor, and a computer program that is stored in the memory and that can be run on the processor, where when executing the program, the processor implements the database query optimization method provided in some embodiments of the present specification.

According to the technical solutions provided in some embodiments of the present specification, the data query request sent by the client device is received, the data query request is parsed, and the execution plan for executing the data query request is determined based on the parsing result; if the determined execution plan is a nested loop anti-join, it is determined whether there is a possibility that the to-be-queried field in the to-be-queried data table indicated by the data query request contains a NULL value; and if there is a possibility that the to-be-queried field contains a NULL value, the filter condition is generated and the execution plan is optimized based on the filter condition. As such, the efficiency and accuracy of database query when the nested loop join is used as the anti-join implementation method can be improved.

It should be understood that the previous general description and the following detailed description are merely examples and explanations, and cannot limit some embodiments of the present specification.

In addition, any one of some embodiments of the present specification does not need to achieve all the previous effects.

BRIEF DESCRIPTION OF DRAWINGS

To describe the technical solutions in some embodiments of the present specification or in the existing technology more clearly, the following briefly describes the accompanying drawings needed for describing some embodiments or the existing technology. Clearly, the accompanying drawings in the following description merely show some embodiments of the present specification, and a person of ordinary skill in the art can still derive other drawings from these accompanying drawings.

DESCRIPTION OF EMBODIMENTS

To make a person skilled in the art better understand the technical solutions in some embodiments of the present specification, the following describes in detail the technical solutions in some embodiments of the present specification with reference to the accompanying drawings in some embodiments of the present specification. Clearly, described embodiments are merely some but not all embodiments of the present specification. All other embodiments obtained by a person of ordinary skill in the art based on some embodiments of the present specification shall fall within the protection scope of the present specification.

Of structured query language (SQL) queries, there is a type of query, whose representations forms are as follows:

Single-value representation: select . . . from T1 where T1.x NOT IN (select T2.y where . . . ); or Vector representation: select . . . from T1 where (T1.a, T1.b) NOT IN (select T2.x, T2.y where . . . ).

Here, NOT IN is equivalent to !=ALL. The previous single-value representation is used as an example. The semantics of the query statement is as follows: For each value of T1.x, if it appears in T2.y, then the T1.x does not satisfy the condition and does not have to be output; if the value of T1.x does not appear in T2.y, then the T1.x satisfies the condition and can be output.

In a relational database, a NULL value is a special existence, and the special thing is that a returned result for comparison between the NULL value and any other value is "unknown", for example, for 5=NULL, 5!=NULL, NULL=NULL, and NULL!=NULL, the returned results are all "unknown". Based on this, when NOT IN is applicable to the NULL value, a special processing method is used. Specifically, the previous single-value representation is still used as an example. If T2.y contains one or more NULL values, then no result should be returned for the entire query. If T1.x contains one or more NULL values, and T2 is not an empty table, then T1.x containing the NULL values is certainly not returned.

For example, assume that T1=(1, 2) and T2=(3, NULL), that is, T1.x has two values: 1 and 2. If T1.x is 1, 1 NOT IN (3, NULL) can be equivalent to 1!=3 and 1!=NULL. Although a returned result of 1!=3 is "true", based on the previous description, a returned result of 1!=NULL is "unknown". Therefore, a logical AND operation is performed on 1!=3 and 1!=NULL, to obtain the final returned result "unknown". In other words, the returned result of 1 NOT IN (3, NULL) is "unknown", that is, 1 does not satisfy the condition, and therefore 1 is not output. If T1.x is 2, the same processing method is used. It can be determined that, if T2.y contains one or more NULL values, then no result should be returned for the entire query.

For another example, assume that T1=(1, NULL) and T2=(2, 3), that is, T1.x has two values: 1 and NULL. If T1.x is 1, 1 NOT IN (2, 3) can be equivalent to 1!=2 and 1!=3. The returned results of 1!=2 and 1!=3 are both "true". Then, the returned result of 1 NOT IN (2, 3) is "true", that is, 1 satisfies the condition and therefore can be output. If T1.x is NULL, NULL NOT IN (2, 3) can be equivalent to NULL!=2 and NULL!=3. Based on the previous description, the returned results of NULL!=2 and NULL!=3 are both "unknown". Therefore, the returned result of NULL NOT IN (2, 3) is "unknown", that is, NULL does not satisfy the condition and is not output. It can be determined that, if T1.x contains one or more NULL values, and T2 is not an empty table, then T1.x containing the NULL values is certainly not returned.

It is worthwhile to further note that, if T1.x contains one or more NULL values, and T2 is an empty table, then the statement NULL NOT IN (empty set) is valid, that is, the returned result is "true". Thus, T1.x containing the NULL values is certainly returned.

The previous description provides accurate query results that should be obtained in various possible cases when NOT IN is applicable to the NULL value.

In existing technologies, because users' needs for querying data in the databases are becoming more complex, a database query needs to be optimized to improve query efficiency and accuracy. To optimize a type of query with join conditions involving the previous NOT IN operator, a conventional technical method is to convert a table join method for such type of query into an anti-join. A join condition for the anti join is T1.x=T2.y, and its semantics is that as long as there is a record that satisfies the join condition in the right table T2, a record that satisfies the join condition in the left table T1 is deleted, and a record that does not satisfy the join condition in T1 is finally returned for the anti-join, which is the same as the query result achieved by NOT IN.

However, when the NLJ algorithm is used as the anti-join implementation method, no accurate query result can be obtained if T1.x contains one or more NULL values. If T2.y contains one or more NULL values, after a query result is obtained by using the NLJ algorithm, the query result needs to be filtered once. A filtering process is specifically as follows: If T2.y is found to contain a NULL value, all data in the query result is filtered out. In other words, an empty query result is finally obtained.

For example, assume that T1=(1, 2) and T2=(3, NULL). When the NLJ algorithm is used as the anti join implementation method, the first record 1 in T1 is taken, then T2 is traversed, and it is determined, based on the join condition T1.x=T2.y, whether T2 contains a matching record. Specifically, first it is determined that 1=3, and the returned result is "false"; then it is determined that 1=NULL, and the returned result is "unknown". Therefore, for 1, there is no record that satisfies the join condition in T2, and 1 can be output. Similarly, the second record 2 in T1 is taken, then T2 is traversed, and it is determined, based on the join condition T1.x=T2.y, whether T2 contains a matching record. It can be finally determined that, for 2, there is no record that satisfies the join condition in T2, and 2 can be output. To be specific, the finally output query result is (1, 2), which is inconsistent with the previously described accurate query result that should be obtained. In such case, to correct such type of error, it can be determined whether T2.y contains the NULL value. If T2.y contains the NULL value, all data in the query result is filtered out, so as to obtain an empty query result. As such, an accurate query result can be obtained.

For another example, assume that T1=(1, NULL) and T2=(2, 3). When the NLJ algorithm is used as the anti join implementation method, the first record 1 in T1 is taken, then T2 is traversed, and it is determined, based on the join condition T1.x=T2.y, whether T2 contains a matching record. Specifically, first it is determined that 1=2, and the returned result is "false"; then it is determined that 1=3, and the returned result is still "false". Therefore, for 1, there is no record that satisfies the join condition in T2, and 1 can be output. Similarly, the second record NULL in T1 is taken, then T2 is traversed, and it is determined, based on the join condition T1.x=T2.y, whether T2 contains a matching record. Specifically, first it is determined that NULL=2, and the returned result is "unknown"; then it is determined that NULL=3, and the returned result is "unknown". Therefore, for NULL, there is no record that satisfies the join condition in T2, and NULL can be output. To be specific, the finally output query result is (1, NULL), which is inconsistent with the previously described accurate query result that should be obtained. However, there is no implementation method for correcting such type of error in related technologies.

In summary, if there is a NULL value in a table to be queried, using the NLJ algorithm as an anti join implementation method affects the query efficiency and accuracy.

In addition, it is worthwhile to further note that, for scenarios where the data in the database uses a vector representation, in the related technologies, the table join method of anti-join cannot be used, and only the table join method of Cartesian join (also known as the Cartesian product) can be used.

To alleviate the previous problems, some embodiments of the present specification provide a database query optimization method. The following describes the method in detail with reference to some embodiments.

Figure 1:
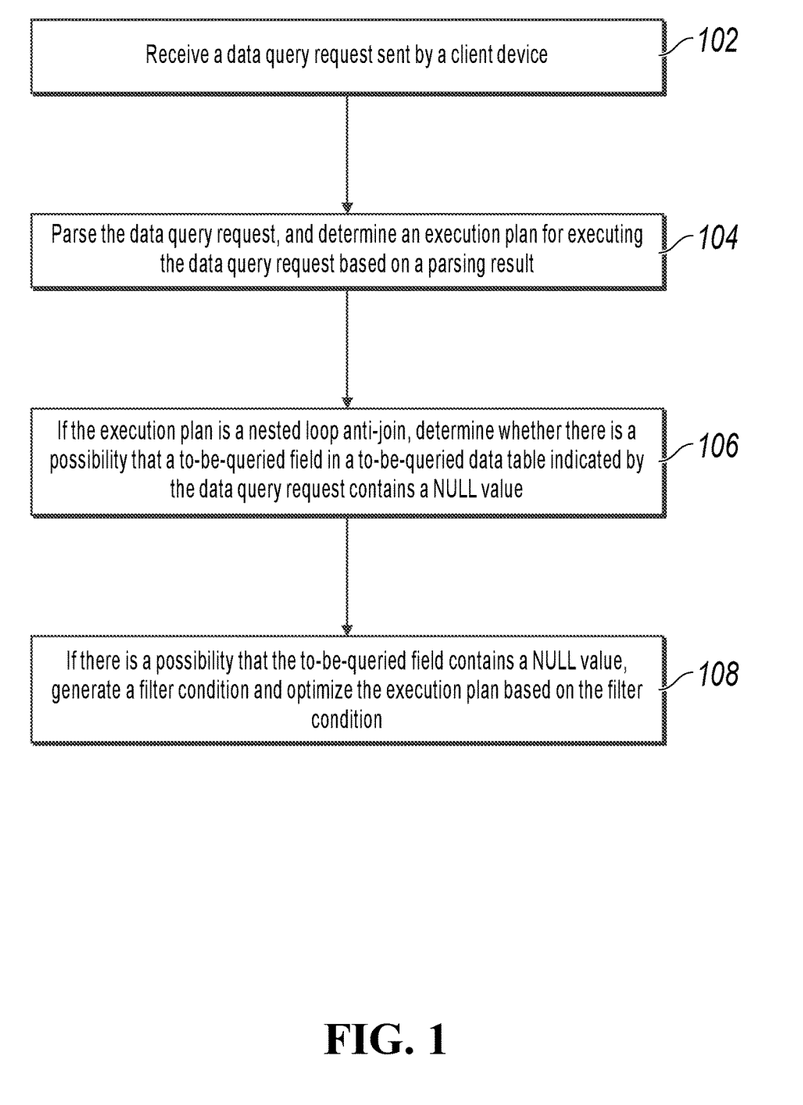
FIG. 1 is a flowchart illustrating some embodiments of a database query optimization method, according to some example embodiments of the present specification.

FIG. 1 is a flowchart illustrating some embodiments of a database query optimization method, according to some example embodiments of the present specification. The method includes the following steps:

Step 102: Receive a data query request sent by a client device.

Step 104: Parse the data query request, and determine an execution plan for executing the data query request based on a parsing result.

In some embodiments of the present specification, when a user executes a query statement on the client device, for example, a select query statement, the client device sends a data query request to a server. The data query request includes the select query statement, and a database process of the server processes the data query request.

When processing the data query request, the database process of the server first parses the data query request to obtain the select query statement, and then parses the select query statement, for example, performs a statement validity check on the select query statement to determine whether the select query statement conforms to a syntax rule. If the select query statement conforms to the syntax rule, the database process continues to check a language meaning of the select query statement to determine whether a data table and a field indicated by the select query statement are both in the database. Further, after the checks on the syntax and semantics of the select query statement succeed, the database process continues to check a data access permission to determine whether the user has a permission to access the to-be-queried data. After the check on the data access permission succeeds, a query optimizer of the database process can determine an execution plan for the select query statement based on a specific rule, that is, the execution plan for the data query request.

For the specific process in which the database process parses the select query statement, and the specific process in which the query optimizer of the database process determines the execution plan for the select query statement based on the specific rule, a person skilled in the art can refer to the detailed descriptions in related technologies, and details are omitted for simplicity in some embodiments of the present specification.

Step 106: If the execution plan is a nested loop anti-join, determine whether there is a possibility that a to-be-queried field in a to-be-queried data table indicated by the data query request contains a NULL value.

It is worthwhile to first note that, the "nested loop anti-join" described in some embodiments of the present specification means using the NLJ algorithm as the anti-join implementation method.

In some embodiments of the present specification, for example, the query statement included in the data query request is "select . . . from T1 where T1.x NOT IN (select T2.y where . . . )". To-be-queried data tables indicated by the query statement are T1 and T2. A to-be-queried field in T1 is a field x, and a to-be-queried field in T2 is a field y. In addition, when nested loop anti-join is performed on T1 and T2, T1 can be referred to as the left table, and T2 can be referred to as the right table.

In some embodiments, NULL attributes of the field x and the field y can be determined respectively, and it can be determined, based on the NULL attributes, whether there is a possibility that the field x and the field y contain NULL values. Specifically, if the NULL attribute is in the default state, it indicates that the value of the field is not allowed to be a NULL value. Thus, no value in the field is a NULL value, and there is no possibility that the field contains a NULL value. On the contrary, if the NULL attribute is in a non-default state, it indicates that the value of the field is allowed to be a NULL value. Thus, the field is allowed to contain a NULL value, that is, there is a possibility that the field contains a NULL value.

Step 108: If there is a possibility that the to-be-queried field contains a NULL value, generate a filter condition and optimize the execution plan based on the filter condition.

In some embodiments of the present specification, if it is determined that there is a possibility that the to-be-queried field contains a NULL value, a filter condition can be generated, and the filter condition can be used as a join condition for inner loop scanning in the nested loop anti-join, so as to optimize the execution plan for the data query request.

The process of generating the filter condition can include determining a data representation form of a field value of the to-be-queried field. The data representation form can be a single-value form or a vector form. In general, the single-value form means that the field value includes only one numeric value, for example, the field value is "1", and the vector form means that the field value includes more than two numeric values, for example, the field value is "(1, 2)", and for another example, the field value is "(1, 2, 3, 4)". In some embodiments of the present specification, the filter condition can be generated based on the data representation form of the field value. Different data representation forms correspond to different filter conditions.

The following describes the generated filter condition in terms of single-value form and vector form separately.

Single-value form:

The generated filter condition, namely, the join condition for the nested loop anti-join can be as follows: filter[T_OP_OR, field value of the to-be-queried field in the left table=field value of the to-be-queried field in the right table, (T_OP_IS, field value of the to-be-queried field in the left table, NULL), (T_OP_IS, field value of the to-be-queried field in the right table, NULL)]. The semantics of the filter condition is as follows: If any one of the following three conditions (1), (2), and (3) is satisfied, a field value that an outer loop currently traverses to is not output.

(1) The field value of the to-be-queried field in the left table appears in the to-be-queried field in the right table.

(2) The field value of the to-be-queried field in the left table includes a NULL value.

(3) The field value of the to-be-queried field in the right table includes a NULL value.

For example, assume that T1=(1, 2) and T2=(1, NULL). The process of performing nested loop anti join on T1 and T2 is as follows: First, the outer loop traverses to the first record 1 in T1. Then, the inner loop starts to traverse T2, and first traverses to the first record 1 in T2. At this time, it can be found that the previous condition (1) is satisfied and the inner loop ends. In such case, a returned result of the inner loop is "true", and the first record 1 in T1 is not output based on the semantics of anti-join. Next, the outer loop continues to traverse to the second record 2 in T1. Then, the inner loop starts to traverse T2, and first traverses to the first record 1 in T2. At this time, it can be found that none of the previous three conditions is satisfied. After that, the inner loop continues to traverse to the second record NULL in T2. At this time, it can be found that the previous condition (3) is satisfied, and the inner loop ends. In such case, a returned result of the inner loop is "true", and the second record 2 in T1 is not output based on the semantics of anti-join. It can be determined that, the final output result is empty, which is consistent with the previous description "If T2.y contains one or more NULL values, then no result should be returned for the entire query."

For another example, assume that T1=(1, NULL) and T2=(1, 3). The process of performing nested loop anti join on T1 and T2 is as follows: First, the outer loop traverses to the first record 1 in T1. Then, the inner loop starts to traverse T2, and first traverses to the first record 1 in T2. At this time, it can be found that the previous condition (1) is satisfied and the inner loop ends. In such case, a returned result of the inner loop is "true", and the first record 1 in T1 is not output based on the semantics of anti-join. Next, the outer loop continues to traverse to the second record NULL in T1. Then, the inner loop starts to traverse T2, and first traverses to the first record 1 in T2. At this time, it can be found that the previous condition (2) is satisfied, and the inner loop ends. In such case, a returned result of the inner loop is "true", and the second record NULL in T1 is not output based on the semantics of anti-join, which is consistent with the previous description "If T1.x contains one or more NULL values, and T2 is not an empty table, then T1.x containing the NULL values is certainly not returned."

Vector Form:

The generated filter condition, namely, the join condition for the nested loop anti-join can be as follows: [T_OP_AND, LNNVL (first numeric value ! in the field value of the to-be-queried field in the left table=first numeric value in the field value of the to-be-queried field in the right table), ..., LNNVL ($n^{th}$ numeric value ! in the field value of the to-be-queried field in the left table=$n^{th}$ numeric value in the field value of the to-be-queried field in the right table)], where n represents a quantity of numeric values in the field value of the to-be-queried field, and n is a natural number not less than 2.

A person skilled in the art can understand that, the meaning of the LNNVL operator in the previous filter condition is that if an expression to be calculated is true, a returned result of LNNVL (expression) is false; otherwise, if the expression to be calculated is false or unknown, the returned result of LNNVL (expression) is true.

The following describes an example of the query result obtained by applying the previous filter condition.

For example, assume that T1=((1, 2), (3, 4)) and T2=((1, 2), (3, NULL)). The process of performing nested loop anti join on T1 and T2 is as follows: First, the outer loop traverses to the first record (1, 2) in T1. Then, the inner loop starts to traverse T2, and first traverses to the first record (1, 2) in T2. Based on the previous filter condition, an expression of the following form can be written: LNNVL (1!=1) AND LNNVL (2!=2). Through operation, it can be concluded that the returned result of the expression is "true". Then, the first record (1, 2) in T1 is not output based on the semantics of anti-join. Next, the outer loop traverses to the second record (3, 4) in T1. Then, the inner loop starts to traverse T2, and first traverses to the first record (1, 2) in T2. A returned result "false" can be obtained based on the previous similar processing. After that, the inner loop continues to traverse to the second record (3, NULL) in T2. A returned result "true" can be obtained based on the previous similar processing. Thus, the second record (3, 4) in T1 is not output based on the semantics of anti-join.

For another example, assume that T1=41, 2), (3, 4)) and T2=41, 2), (2, NULL)). Then, when the process of nested loop anti join goes to the step of traversing to the second record (3, 4) in T1 by the outer loop and traversing to the second record (2, NULL) in T2 by the inner loop, a returned result "unknown" can be obtained. In such case, the second record (3, 4) in T1 can be output based on the semantics of anti-join.

It can be understood by a person skilled in the art that, the final output result in the previous example conforms to the semantics of NOT IN; it can be determined that, after the execution plan of nested loop anti-join is optimized based on the previous filter condition, the table join method of anti join can be implemented in the scenario where the data in the database uses a vector representation.

According to the technical solutions provided in some embodiments of the present specification, the data query request sent by the client device is received, the data query request is parsed, and the execution plan for executing the data query request is determined based on the parsing result; if the determined execution plan is a nested loop anti-join, it is determined whether there is a possibility that the to-be-queried field in the to-be-queried data table indicated by the data query request contains a NULL value; and if there is a possibility that the to-be-queried field contains a NULL value, the filter condition is generated and the execution plan is optimized based on the filter condition. As such, the efficiency and accuracy of database query when the nested loop join is used as the anti-join implementation method can be improved.

Figure 2:
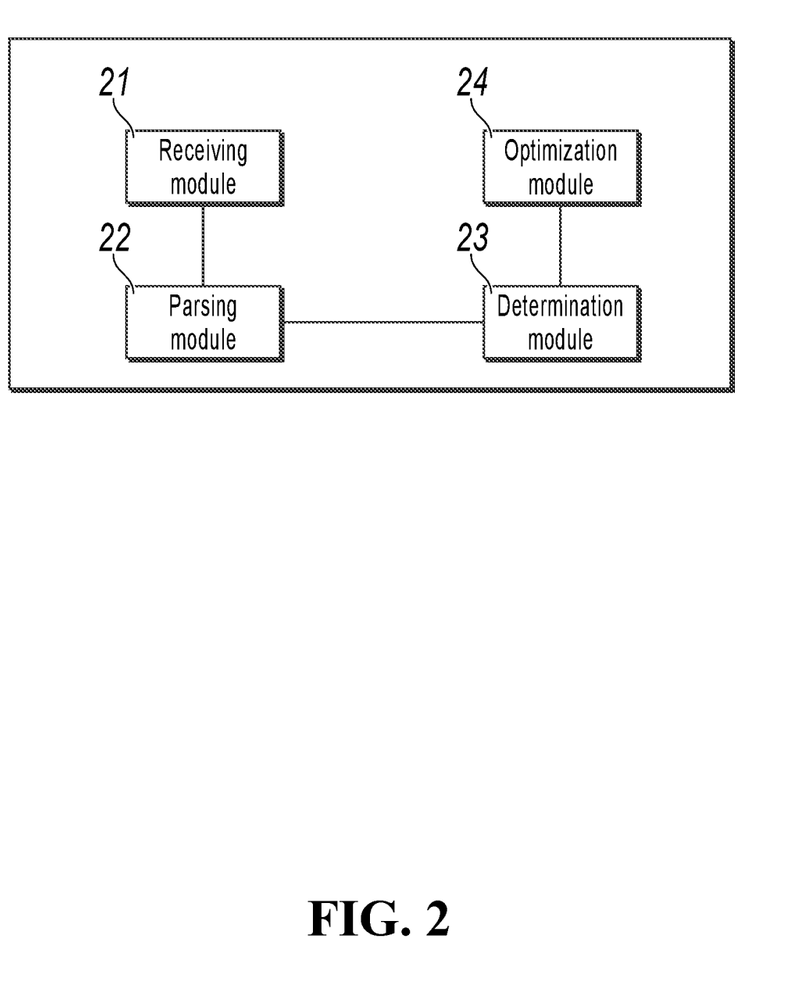
FIG. 2 is a block diagram illustrating some embodiments of a database query optimization apparatus, according to some example embodiments of the present specification.

Corresponding to previous method embodiments, some embodiments of the present specification further provide a database query optimization apparatus. FIG. 2 is a block diagram illustrating some embodiments of a database query optimization apparatus, according to some example embodiments of the present specification. The apparatus can include a receiving module 21, a parsing module 22, a determination module 23, and an optimization module 24.

The receiving module 21 is configured to receive a data query request sent by a client device.

The parsing module 22 is configured to parse the data query request, and determine an execution plan for executing the data query request based on a parsing result.

The determination module 23 is configured to: if the execution plan is a nested loop anti-join, determine whether there is a possibility that a to-be-queried field in a to-be-queried data table indicated by the data query request contains a NULL value.

The optimization module 24 is configured to: if there is a possibility that the to-be-queried field contains a NULL value, generate a filter condition and optimize the execution plan based on the filter condition.

In some embodiments, the determination module 23 is specifically configured to: determine a NULL attribute of a to-be-queried field in a to-be-queried data table indicated by the data query request; if the NULL attribute of the to-be-queried field is in a default state, determine that there is no possibility that the to-be-queried field contains a NULL value; if the NULL attribute of the to-be-queried field is in a non-default state, determine that there is a possibility that the to-be-queried field contains a NULL value.

The default state indicates that a value of the field is not allowed to be a NULL value, and the non-default state indicates that the value of the field is allowed to be a NULL value.

In some embodiments, the optimization module 24 includes the following (not shown in FIG. 2): a form determination sub-module, configured to determine a data representation form of the field value of the to-be-queried field in the to-be-queried data table, where the data representation form is a single-value form or a vector form; and a generation sub-module, configured to generate a filter condition based on the data representation form, where different data representation forms correspond to different filter conditions.

In some embodiments, the generation sub-module is specifically configured to: if the data representation form is a single-value form, generate the following filter condition: filter[T_OP_OR, field value of the to-be-queried field in the left table=field value of the to-be-queried field in the right table, (T_OP_IS, field value of the to-be-queried field in the left table, NULL), (T_OP_IS, field value of the to-be-queried field in the right table, NULL)]; if the representation form is a vector form, generate the following filter condition: [T_OP_AND, LNNVL (first numeric value ! in the field value of the to-be-queried field in the left table=first numeric value in the field value of the to-be-queried field in the right table), . . . , LNNVL ($n^{th}$ numeric value ! in the field value of the to-be-queried field in the left table=$n^{th}$ numeric value in the field value of the to-be-queried field in the right table)], where n represents a quantity of numeric values in the field value of the to-be-queried field, and n is a natural number not less than 2.

In some embodiments, the optimization module 24 is specifically configured to: use the filter condition as a join condition for inner loop scanning in the nested loop anti-join.

It can be understood that the receiving module 21, the parsing module 22, the determination module 23, and the optimization module 24 are four functionally independent modules, which can be jointly configured in the apparatus, as shown in FIG. 2, or can be separately configured in the apparatus. Therefore, the structure shown in FIG. 2 should not be construed as a limitation on the solutions in some embodiments of the present specification.

In addition, for an implementation process of functions and roles of each module in the apparatus, references can be made to an implementation process of a corresponding step in the previous method. Details are omitted here for simplicity.

Some embodiments of the present specification further provide a computer device. The computer device includes at least a memory, a processor, and a computer program that is stored in the memory and that can be run on the processor. When executing the program, the processor implements the previous database query optimization method. The method includes at least the following: receiving a data query request sent by a client device, where the data query request includes a select query statement; parsing the select query statement, and determining an execution plan for executing the select query statement based on a parsing result; if the execution plan is a nested loop anti-join, determining whether there is a possibility that a to-be-queried field in a to-be-queried data table indicated by the select query statement contains a NULL value; and if there is a possibility that the to-be-queried field contains a NULL value, generating a filter condition and optimizing the execution plan based on the filter condition.

Figure 3:
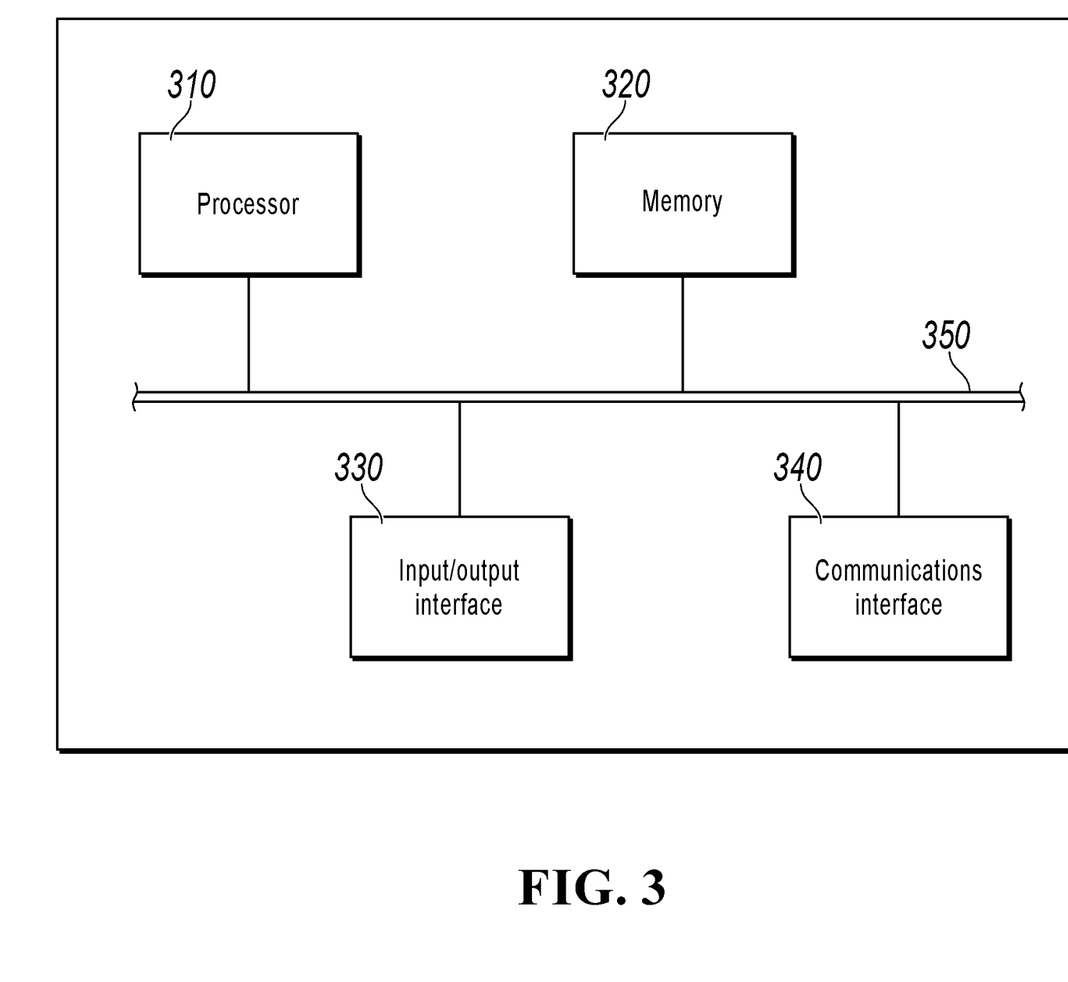
FIG. 3 is a schematic structural diagram illustrating more specific hardware of a computing device, according to some embodiments of the present specification.

FIG. 3 is a schematic structural diagram illustrating more specific hardware of a computing device, according to some embodiments of the present specification. The device can include: a processor 310, a memory 320, an input/output interface 330, a communications interface 340, and a bus 350. The processor 310, the memory 320, the input/output interface 330, and the communications interface 340 are communicatively connected to each other within the device by using the bus 350.

The processor 310 can be implemented in a form of a general-purpose central processing unit (CPU), a microprocessor, an application-specific integrated circuit (ASIC), one or more integrated circuits, etc., and is configured to execute a related program, to implement the technical solutions provided in some embodiments of the present specification.

The memory 320 can be implemented in a form of a read-only memory (ROM), a random access memory (RAM), a static storage device, a dynamic storage device, etc. The memory 320 can store an operating system and other application programs. When the technical solutions provided in some embodiments of the present specification are implemented by software or firmware, related program code is stored in the memory 320, and invoked and executed by the processor 310.

The input/output interface 330 is configured to connect an input/output module to implement information input and output. The input/output module can be configured as a component in the device (not shown in FIG. 3), or can be externally connected to the device to provide a corresponding function. The input device can include a keyboard, a mouse, a touchscreen, a microphone, various sensors, etc., and the output device can include a display, a speaker, a vibrator, an indicator, etc.

The communications interface 340 is configured to connect a communications module (not shown in FIG. 3) to implement communication and interaction between the device and other devices. The communications module can implement communication through a wired method (such as a USB, a network cable, etc.), or through a wireless method (such as a mobile network, Wi-Fi, Bluetooth, etc.).

The bus 350 includes a channel to transmit information between various components (for example, the processor 310, the memory 320, the input/output interface 330, and the communications interface 340) of the device.

It is worthwhile to note that, although only the processor 310, the memory 320, the input/output interface 330, the communications interface 340, and the bus 350 are shown in the previous device, in the actual implementation process, the device can further include other components that are necessary for normal operation. In addition, a person skilled in the art can understand that, the previous device can include only the components that are necessary for implementing the solutions in some embodiments of the present specification, and does not necessarily include all the components shown in the figure.

Some embodiments of the present specification further provide a computer readable storage medium, where the computer readable storage medium stores a computer program. When being executed by a processor, the program implements the previous database query optimization method. The method includes at least the following: receiving a data query request sent by a client device; parsing the data query request, and determining an execution plan for executing the data query request based on a parsing result; if the execution plan is a nested loop anti-join, determining whether there is a possibility that a to-be-queried field in a to-be-queried data table indicated by the data query request contains a NULL value; and if there is a possibility that the to-be-queried field contains a NULL value, generating a filter condition and optimizing the execution plan based on the filter condition.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computer device. Based on the definition in the present specification, the computer readable medium does not include transitory media such as a modulated data signal and carrier.

It can be seen from the previous descriptions of the implementations that, a person skilled in the art can clearly understand that some embodiments of the present specification can be implemented by using software and a necessary general hardware platform. Based on such an understanding, the technical solutions in some embodiments of the present specification essentially or the part contributing to the existing technology can be implemented in a form of a software product. The computer software product can be stored in a storage medium, such as a ROM/RAM, a magnetic disk, or an optical disc, and includes some instructions for instructing a computer device (which can be a personal computer, a server, a network device, etc.) to perform the method described in some embodiments of the present specification or in some parts of some embodiments of the present specification.

The system, apparatus, module, or unit illustrated in previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Some embodiments of the present specification are described in a progressive way. For same or similar parts of some embodiments, mutual references can be made to some embodiments. Each embodiment focuses on a difference from other embodiments. Particularly, apparatus embodiments are similar to method embodiments, and therefore are described briefly. For a related part, references can be made to some descriptions in the method embodiments. The previously described apparatus embodiments are merely examples. The modules described as separate parts can or cannot be physically separate. During implementation of the solutions in some embodiments of the present specification, functions of the modules can be implemented in one or more pieces of software and/or hardware. Some or all of the modules can be selected based on an actual need to implement the solutions of some embodiments. A person of ordinary skill in the art can understand and implement some embodiments of the present specification without creative efforts.

The previous descriptions are merely specific implementations of some embodiments of the present specification. It is worthwhile to note that a person of ordinary skill in the art can further make some improvements or polishing without departing from the principle of some embodiments of the present specification, and the improvements or polishing shall fall within the protection scope of some embodiments of the present specification.

What is claimed is:

1. A computer-implemented method for database query optimization, comprising:
    receiving a data query request sent by a client device;
    obtaining a parsing result by parsing the data query request;
    determining, based on the parsing result, that an execution plan for executing the data query request is a nested loop anti-join, wherein the nested loop anti-join comprises a nested loop join algorithm for implementing an anti-join;
    in response to determining that the execution plan is the nested loop anti-join, determining that a probability is greater than zero that a to-be-queried field in two to-be-queried data tables indicated by the data query request contains a NULL value, wherein the two to-be-queried data tables comprise a left to-be-queried data table and a right to-be-queried data table, and wherein determining that the probability is greater than zero that the to-be-queried field in the two to-be-queried data tables indicated by the data query request contains a NULL value comprises:
        determining a NULL attribute of the to-be-queried field in the two to-be-queried data tables indicated by the data query request; and
    in response to determining that the probability is greater than zero that the to-be-queried field contains a NULL value, generating a filter condition and optimizing the execution plan based on the filter condition generated, wherein the filter condition comprises that a field value of a second to-be-queried field in the left to-be-queried data table associated with the data query request comprises a NULL value, wherein the field value is currently traversed to by an outer loop of the nested loop join algorithm, wherein the outer loop traverses the left to-be-queried data table, and wherein the optimizing the execution plan based on the filter condition generated comprises:

if the field value of the second to-be-queried field in the left to-be-queried data table comprises a NULL value, the field value is not output as part of a query result for the data query request.

2. The computer-implemented method of claim 1, further comprising:

in response to determining that the NULL attribute of the to-be-queried field is in a default state, determining that the probability that the to-be-queried field contains a NULL value is zero, wherein the default state indicates that a value of the to-be-queried field is not allowed to be a NULL value; and in response to determining that the NULL attribute of the to-be-queried field is in a non-default state, determining that the probability that the to-be-queried field contains a NULL value is greater than zero, wherein the non-default state indicates that the value of the to-be-queried field is allowed to be a NULL value.

3. The computer-implemented method of claim 1, wherein generating the filter condition comprises:

determining a data representation form of a field value of the to-be-queried field in the two to-be-queried data tables, wherein the data representation form comprises a single-value form or a vector form; and generating the filter condition based on the data representation form, wherein different data representation forms correspond to different filter conditions.

4. The computer-implemented method of claim 3, wherein generating the filter condition based on the data representation form comprises:

in response to determining that the data representation form is the single-value form, generating a first filter condition.

5. The computer-implemented method of claim 4, further comprising:

in response to determining that the data representation form is the vector form, generating a second filter condition.

6. The computer-implemented method of claim 1, wherein optimizing the execution plan based on the filter condition generated comprises:

applying the filter condition generated as a join condition for inner loop scanning in the nested loop anti-join.

7. A non-transitory, computer-readable medium storing one or more instructions executable by a computer system to perform operations comprising:

receiving a data query request sent by a client device;

obtaining a parsing result by parsing the data query request;

determining, based on the parsing result, that an execution plan for executing the data query request is a nested loop anti-join, wherein the nested loop anti-loin comprises a nested loop loin algorithm for implementing an anti-join;

in response to determining that the execution plan is the nested loop anti-join, determining that a probability is greater than zero that a to-be-queried field in two to-be-queried data tables indicated by the data query request contains a NULL value, wherein the two to-be-queried data tables comprise a left to-be-queried data table and a right to-be-queried data table, and wherein determining that the probability is greater than zero that the to-be-queried field in the two to-be-queried tables indicated by the data query request contains a NULL value comprises:

determining a NULL attribute of the to-be-queried field in the two to-be-queried data tables indicated by the data query request; and in response to determining that the probability is greater than zero that the to-be-queried field contains a NULL value, generating a filter condition and optimizing the execution plan based on the filter condition generated, wherein the filter condition comprises that a field value of a second to-be-queried field in the left to-be-queried data table associated with the data query request comprises a NULL value, wherein the field value is currently traversed to by an outer loop of the nested loop join algorithm, wherein the outer loop traverses the left to-be-queried data table, and wherein the optimizing the execution plan based on the filter condition generated comprises:

if the field value of the second to-be-queried field in the left to-be-queried data table comprises a NULL value, the field value is not output as part of a query result for the data query request.

8. The non-transitory, computer-readable medium of claim 7, further comprising:

in response to determining that the NULL attribute of the to-be-queried field is in a default state, determining that the probability that the to-be-queried field contains a NULL value is zero, wherein the default state indicates that a value of the to-be-queried field is not allowed to be a NULL value; and in response to determining that the NULL attribute of the to-be-queried field is in a non-default state, determining that the probability that the to-be-queried field contains a NULL value is greater than zero, wherein the non-default state indicates that the value of the to-be-queried field is allowed to be a NULL value.

9. The non-transitory, computer-readable medium of claim 7, wherein generating the filter condition comprises:

determining a data representation form of a field value of the to-be-queried field in the two to-be-queried data tables, wherein the data representation form comprises a single-value form or a vector form; and generating the filter condition based on the data representation form, wherein different data representation forms correspond to different filter conditions.

10. The non-transitory, computer-readable medium of claim 9, wherein generating the filter condition based on the data representation form comprises:

in response to determining that the data representation form is the single-value form, generating a first filter condition.

11. The non-transitory, computer-readable medium of claim 10, further comprising:

in response to determining that the data representation form is the vector form, generating a second filter condition.

12. The non-transitory, computer-readable medium of claim 7, wherein optimizing the execution plan based on the filter condition generated comprises:

applying the filter condition generated as a join condition for inner loop scanning in the nested loop anti-join.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a data query request sent by a client device;
obtaining a parsing result by parsing the data query request;
determining, based on the parsing result, that an execution plan for executing the data query request is a nested loop anti-join, wherein the nested loop anti-loin comprises a nested loop join algorithm for implementing an anti-join;
in response to determining that the execution plan is the nested loop anti-join, determining that a probability is greater than zero that a to-be-queried field in two to-be-queried data tables indicated by the data query request contains a NULL value, wherein the two to-be-queried data tables comprise a left to-be-queried data table and a right to-be-queried data table, and wherein determining that the probability is greater than zero that the to-be-queried field in the two to-be-queried data tables indicated by the data query request contains a NULL value comprises:
determining a NULL attribute of the to-be-queried field in the two to-be-queried data tables indicated by the data query request; and
in response to determining that the probability is greater than zero that the to-be-queried field contains a NULL value, generating a filter condition and optimizing the execution plan based on the filter condition generated, wherein the filter condition comprises that a field value of a second to-be-queried field in the left to-be-queried data table associated with the data query request comprises a NULL value, wherein the field value is currently traversed to by an outer loop of the nested loop loin algorithm, wherein the outer loop traverses the left to-be-queried data table, and wherein the optimizing the execution plan based on the filter condition generated comprises:
if the field value of the second to-be-queried field in the left to-be-queried data table comprises a NULL value, the field value is not output as part of a query result for the data query request.

14. The computer-implemented system of claim 13, further comprising:
in response to determining that the NULL attribute of the to-be-queried field is in a default state, determining that the probability that the to-be-queried field contains a NULL value is zero, wherein the default state indicates that a value of the to-be-queried field is not allowed to be a NULL value; and
in response to determining that the NULL attribute of the to-be-queried field is in a non-default state, determining that the probability that the to-be-queried field contains a NULL value is greater than zero, wherein the non-default state indicates that the value of the to-be-queried field is allowed to be a NULL value.

15. The computer-implemented system of claim 13, wherein generating the filter condition comprises:
determining a data representation form of a field value of the to-be-queried field in the two to-be-queried data tables, wherein the data representation form comprises a single-value form or a vector form; and
generating the filter condition based on the data representation form, wherein different data representation forms correspond to different filter conditions.

16. The computer-implemented system of claim 15, wherein generating the filter condition based on the data representation form comprises:
in response to determining that the data representation form is the single-value form, generating a first filter condition; and
in response to determining that the data representation form is the vector form, generating a second filter condition.

17. The computer-implemented system of claim 13, wherein optimizing the execution plan based on the filter condition generated comprises:
applying the filter condition generated as a join condition for inner loop scanning in the nested loop anti-join.

* * * * *

UNITED STATES PATENT AND TRADEMARK OFFICE
CERTIFICATE OF CORRECTION

PATENT NO. : 11,256,697 B2
APPLICATION NO. : 17/084840
DATED : February 22, 2022
INVENTOR(S) : Yingying Yao et al.

It is certified that error appears in the above-identified patent and that said Letters Patent is hereby corrected as shown below:

In the Claims

In Claim 7, Column 13, Line 60, replace "anti-loin" with -- anti-join --, therefor.

In Claim 7, Column 13, Line 61, replace "loin" with -- join --, therefor.

In Claim 7, Column 14, Line 4, replace "to-be-queried tables" with -- to-be-queried data tables --, therefor.

In Claim 13, Column 15, Line 14-15, replace "anti-loin" with -- anti-join --, therefor.

In Claim 13, Column 15, Line 40, replace "loin" with -- join --, therefor.

Signed and Sealed this
Seventh Day of June, 2022

Katherine Kelly Vidal
*Director of the United States Patent and Trademark Office*